(12) United States Patent
Zahn

(10) Patent No.: US 7,291,276 B1
(45) Date of Patent: Nov. 6, 2007

(54) CONTROLLED PRODUCTION AND RELEASE OF OXYGEN ACTIVATED BIOCIDE INTO HOLDING TANKS FOR RV'S, BOATS AND THE LIKE

(75) Inventor: Neal Zahn, Tulsa, OK (US)

(73) Assignee: Winston Company, Inc., Tulsa, OK (US)

( * ) Notice: Subject to any disclaimer, the term of this patent is extended or adjusted under 35 U.S.C. 154(b) by 266 days.

(21) Appl. No.: 11/157,537

(22) Filed: Jun. 21, 2005

Related U.S. Application Data

(60) Provisional application No. 60/581,491, filed on Jun. 21, 2004.

(51) Int. Cl.
  *C11D 7/20* (2006.01)
(52) U.S. Cl. ............ 210/759; 510/224; 510/294; 510/298; 510/349; 510/441
(58) Field of Classification Search ............ 210/759; 510/446
  See application file for complete search history.

(56) References Cited

U.S. PATENT DOCUMENTS

| | | | |
|---|---|---|---|
| 3,082,107 A | 3/1963 | Kiefer | 106/180 |
| T0,102,905 I4 * | 4/1983 | Kibbel, Jr. | 210/759 |
| 5,185,080 A | 2/1993 | Boyle | 210/611 |
| 5,185,356 A | 2/1993 | Backhouse et al. | 514/372 |
| 5,206,168 A | 4/1993 | Boyle | 435/262 |
| 5,207,899 A | 5/1993 | Boyle | 210/138 |
| 5,287,967 A | 2/1994 | Backhouse et al. | 206/524.7 |
| 6,380,141 B1 * | 4/2002 | Gordon | 510/224 |
| 2001/0009892 A1 * | 7/2001 | Bonsall | 510/224 |

OTHER PUBLICATIONS

Kibbel, U.S. Appl. No. 06/308,625, filed Oct. 5, 1981, laid open to public inspection on Apr. 5, 1983.*

* cited by examiner

*Primary Examiner*—Walter D. Griffin
*Assistant Examiner*—Cameron J Allen
(74) *Attorney, Agent, or Firm*—Head, Johnson & Kachigian

(57) ABSTRACT

Waste in a black or gray water holding tank is treated by an oxygen activated biocide by the addition of tetra acetyl ethylene diamine (TAED) and a peroxygen compound. Hydrogen peroxide and/or peracetic acid are released over a period of time and thus maintained in the wastewater solution. Peracetic acid under controlled release conditions dissipates prior to the wastewater being deposited in a wastewater treatment plant.

13 Claims, 1 Drawing Sheet

TAED  Hydrogen Peroxide  Peracetic Anion  DAED

CONTROLLED PRODUCTION AND RELEASE OF OXYGEN ACTIVATED BIOCIDE INTO HOLDING TANKS FOR RV'S, BOATS AND THE LIKE

CROSS-REFERENCE TO PENDING APPLICATIONS

This application is based on U.S. Provisional Patent Application No. 60/581,491 filed Jun. 21, 2004 and entitled "Controlled Production and Release of Oxygen Activated Biocide Into Holding Tanks for RV's, Boats and the Like".

BACKGROUND OF THE INVENTION

1. Field of the Invention

The present invention relates to a method and apparatus for the timed, controlled release of oxygen activated biocide into holding tanks for RV's, boats and the like. Specifically, the present invention relates to the controlled release of hydrogen peroxide, TAED, surfactants, dyes, enzymes and binders into a system, such as a black or gray water holding tank, on a recreational vehicle, boat, airplane or the like that maintains biocidal activity for a predetermined length of time.

2. Prior Art

Many recreational vehicles have wastewater holding tanks. Recreational vehicles ("RV"), buses, boats including cruise liners and airplanes all store a significant amount of waste in a black or gray water holding tank that is later deposited at a waste treatment center such as a septic tank or a sewage treatment facility. The waste inside the holding tanks is typically stored for a 3-5 day period and up to a 10-14 day period. Wastewater treatment facilities, including septic tanks and lagoon systems for small developments, employ biological processes to stabilize and remove pollutants from wastewater streams. These biological processes perform best when they approach steady-state conditions which include constant waste stream temperature, flow rate, and composition. In reality, each of these variables tend to fluctuate seasonally and weekly as a result of typical recreation use patterns.

Holding tanks on boats and RVs are used to keep all sanitary wastes onboard when a sewer or water treatment system is unavailable. Since little or no carriage water is used, as is in typical domestic sanitary waste streams, holding tank wastewater is far more concentrated than typical domestic wastewater. Additives are introduced into these tanks, primarily to control odors. There are a wide variety of such additives used, the most common of which are formaldehyde-based compounds. Other types include those based on quaternary ammonium compounds ("quats," which often impart a pine scent) and enzyme formulations. In general, while these additives work well to control odors aboard the boat or RV, they complicate the treatment and disposal of the resulting mixture.

Generally, treatment facilities are designed on the basis of two primary parameters: hydraulic capacity (gallons per day) and organic strength (biochemical oxygen demand, or BOD) of the waste stream. Usually it is much easier to predict the hydraulic capacity needed for a treatment facility than the organic strength of the wastewater that it will receive. Highly concentrated holding tank wastes, containing variable amounts and types of chemical additives, make proper design of treatment facilities difficult. Further, the typical mode of introducing wastes into the receiving station—dumping—is not conducive to the steady-state flow needed for optimal biological treatment.

These holding tanks are very susceptible to proliferation of a wide variety of microorganisms including pathogens and the odors generated by their activity. Therefore, it is desirable to provide a means for minimizing the growth of microorganisms, thus, minimizing or reducing odors, while in a holding tank. However, many wastewater treatment centers utilize microorganisms to aide in the elimination of contaminants from wastewater before it is returned to the environment. Because of this, the wastewater in the holding tank should not contain biocides or disinfectants that sustain activity for extended periods of time that might harm or kill the microorganisms used in a wastewater treatment system.

Existing products used to disinfect wastewater in a holding tank fall within two categories. The first is products having formaldehyde. Second, there are a group of products that use quaternary amine compounds. These products and combinations thereof are known in the art. Both types of products are harmful to the microorganisms utilized in wastewater treatment systems. Further, formaldehyde and quaternary amines degrade slowly. Because of this, they are difficult to remove from the wastewater before treating it. Additionally, it is not desirable and in some cases not permitted to allow formaldehydes or quaternary amines to enter septic tanks which lead into the ground water and soil.

Some of the existing products contain chemicals which may also adversely impact the septic systems that receive your holding tank contents and, as a result, may pollute water resources. These chemicals and their by-products can kill the good bacteria in septic systems and may contribute to the discharge of dangerous, contaminated, health-threatening effluent to the soil surface or into groundwater or nearby surface waters.

Many RV facilities throughout the country rely on onsite septic systems to treat sewage and septic systems are particularly vulnerable to chemical contamination.

The present invention proposes the use of slow release of oxygen-activated biocide. The biocide stops functioning once the wastewater is later deposited in a septic tank or wastewater system.

It is, therefore, desirable to provide a method for treating wastewater in a black or gray water holding tank to kill substantially all microorganisms within it while in the holding tank without the resulting wastewater composition having a deleterious effect on septic tanks or sewage treatment plants into which it is later deposited.

SUMMARY OF THE INVENTION

The present invention provides a means for destroying microorganisms in waste in a black or gray water holding tank such that there are substantially no biocidal compounds remaining in the black or gray water holding tank when the wastewater is transferred to a wastewater treatment plant. In this manner, the wastewater is effectively disinfected and the microorganisms in a subsequent water treatment plant are not harmed. This is accomplished by using a strong antimicrobial that may be depleted over some scheduled period of time.

In one embodiment, two precursor compounds are provided in solid form and are released a little at a time in order to maintain a steady concentration of the antimicrobial chemical. The two precursor chemicals consist of tetra acetyl ethylene diamine (TAED) and a peroxygen compound. Both are readily available in a powder form and do not react until they are mixed together in an aqueous solution. Once in solution, they react to form peracetic acid. Those skilled in the art will appreciate that this is a known reaction that is used in laundry detergents. Hydrogen Peroxide ($H_2O_2$) and peracetic acid react and degrade relatively rapidly. Because of this, the $H_2O_2$ and peracetic acid will not be present when the wastewater is transferred to a wastewater treatment facility.

Hydrogen peroxide ($H_2O_2$) and peracetic acid are known antimicrobials. However, they are highly volatile compounds that are preferably not stored or transported in large quantities. Because of this, it is preferred to store or transport the two more stable precursors TAED and a peroxygen compound. Peracetic acid is not formed until these two solids are mixed together in an aqueous solution.

In the prior art, the formation of $H_2O_2$ or peracetic acid using the two precursor compounds is generally applied in situations that only need disinfectant properties for a short time period, such as in a laundry detergent. This antimicrobial has previously been seen as unsuitable for providing adequate disinfecting properties for long periods of time from several hours to several days. This is because of the rapid reaction and degradation of $H_2O_2$ and peracetic acid. The present invention overcomes this deficiency by controlling the release of the precursor chemicals over time. This allows an adequate concentration of both $H_2O_2$ and peracetic acid to be formed and/or maintained for a desired extended length of time. Once release of the chemicals into the black or gray wastewater tank ceases, the concentration of $H_2O_2$ and peracetic acid rapidly declines and disappears. The black or gray water in the holding tank is then suitable for deposit into a wastewater treatment facility.

It is, therefore, an object of the present invention to provide a means for introducing an oxygen activated biocide agent into a black or gray water holding tank that degrades prior to being introduced to a wastewater treatment system.

BRIEF DESCRIPTION OF THE DRAWINGS

FIG. 1 shows an example of the chemical reaction of two of the precursor chemicals resulting in peracetic acid for release into a black or gray water holding tank for RVs, boats and the like.

DETAILED DESCRIPTION OF THE PREFERRED EMBODIMENTS

Figure 1:
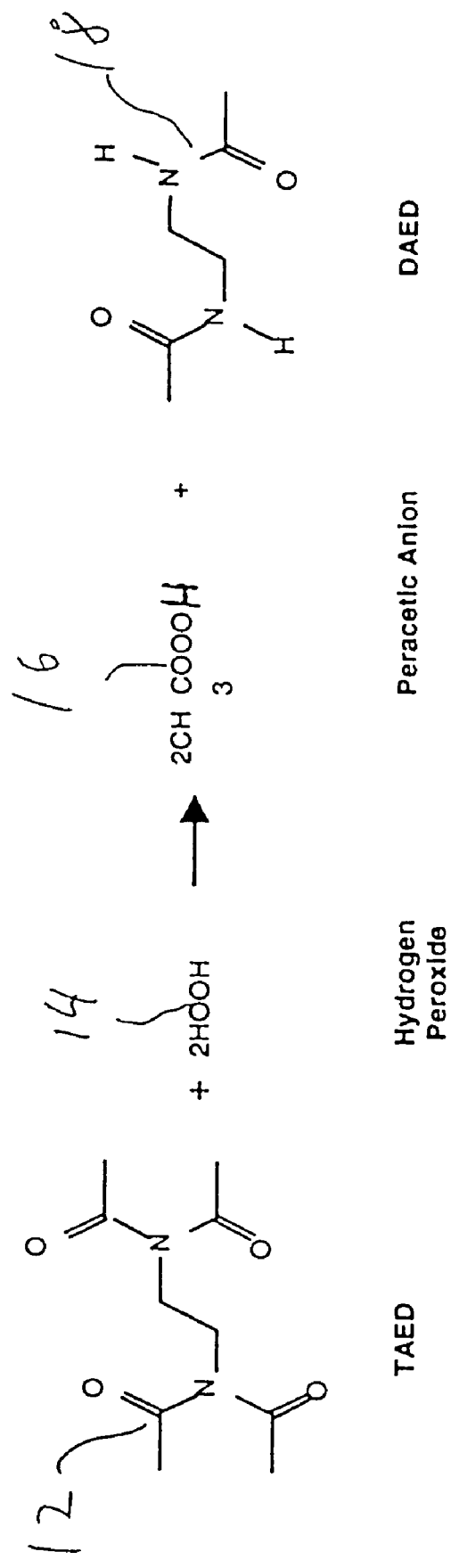

The embodiments discussed herein are merely illustrative of specific manners in which to make and use the invention and are not to be interpreted as limiting the scope of the present invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention the antimicrobial agent peracetic acid is formed by the reaction between two precursor chemicals. Because peracetic acid is volatile and reacts and degrades rapidly, it does not remain in the solution for a long period of time. Because of this, the present invention provides a continuous supply of fresh peracetic acid by controlling the release of the precursor chemicals into solution over time. Once the precursor chemicals cease to be added to the wastewater, the peracetic acid continues to degrade. Therefore, the wastewater treated by the present invention may be safely transferred to a wastewater treatment facility only a few hours after the precursor chemicals have ceased to be administered. Wastewater treated in this manner will not disrupt the microorganisms of a wastewater treatment facility.

Likewise hydrogen peroxide is volatile and reacts and degrades rapidly and does not remain in solution for a long period of time.

The two precursors comprise TAED and a peroxygen compound. Both are well known in the art as being adequate precursors for peracetic acid. FIG. 1 shows the reaction utilized by the present invention. In reaction 10, TAED 12 reacts with hydrogen peroxide that is supplied by and is a component of the peroxygen compound. In a preferred embodiment, the peroxygen compound is sodium percarbonate ($2Na_2CO_3$). Calcium peroxide, sodium perborate, and perborate monohydrate are also suitable, but do not work as well as sodium percarbonate. Those skilled in the art of chemistry will appreciate that any similar peroxygen capable of releasing or forming hydrogen peroxide in an aqueous solution will be a suitable peroxygen compound.

TAED 12 and hydrogen peroxide 14 react to produce peracetic acid 16 and diacetyl ethylene diamine (DAED). DAED is a harmless bi-product of the reaction.

Preferably, the wastewater being treated is maintained at a relatively neutral pH. The prior art in the detergent industry teaches a preference for an alkaline environment. Under aqueous alkaline conditions, one mole of T.A.E.D. reacts with two moles of peroxide anion to produce one mole of D.A.E.D. (Diacetyl Ethylene Diamine) and two moles of peracetate anion. It is the peracetate anion which is active in bleaching and the one responsible for biocidal activity. However, peracetic acid's activity is enhanced and sustained at a more neutral pH.

It may be desirable to add additional chemicals to the black or gray water in the holding tank. Non-toxic, organic acids may be utilized for adjusting the pH. Preferably, citric acid is used although other types of acids may be utilized. In addition, water softeners, fragrances, dyes and enzymes may also be added to the wastewater in the black or gray water holding tank.

Any of a variety of methods may be used to time and control the release of the two precursor chemicals into the holding tank. The two precursor chemicals are readily available in solid powder form. They may be used to make one or more tablets held together by a binding material that dissolves in water at a known rate. The rate at which the binding material dissolves will regulate the rate at which the precursor chemicals are introduced into the wastewater. Alternatively, the precursor chemicals may be dissolved into individual solutions and stored in reservoirs from which they are introduced to the wastewater at a predetermined rate. This provides for a constant concentration of peracetic acid. Tablets may be made in a variety of sizes designed to last one or several hours or one or more days. Wastewater may be deposited in a water treatment plant only a few hours after the last tablet dissolves, or the last addition is made from solution reservoirs.

The oxygen activated biocide are packaged in either a water soluble pouch (bag), tablet (puck) and/or gel capsule to assure a slow and more continual release of a safe and environmentally friendly biocide and cleaning agent via the in situ generation of peracetic acid (generated when $H_2O_2$ and TAED combine in situ) within a holding tank.

The present invention might also include tracer dyes in a selected color or colors to let regulators and others know that the discharge from the gray or black water holding tank has been treated to be environmentally friendly.

The present invention is environmentally friendly and work synergistically with waste treatments centers. This is because the peracetic acid and hydrogen peroxide degrade and therefore do not interfere with the chemicals and/or bacteria of the waste treatment facility.

The following examples illustrate the effectiveness of the invention. The following test kit was used to determine the Hydrogen peroxide and Peracetic acid concentration.

To determine Hydrogen peroxide concentration the sample is mixed with 10 ml of 1:1 Sulfuric acid solution. To this mixture a drop of ferroin indicator is added which changes the color to pale orange-pink. This solution is titrated against Cerric nitrate solution (24% cerric nitrate, 6% sulfuric acid, 70% water) to determine the Hydrogen peroxide concentration. The end point is the color change from pale orange pink to colorless or pale yellow.

To determine peracetic acid concentration the sample is mixed with 10 ml of 1:1 solution Sulfuric acid. To this mixture a drop of ferroin indicator is added and one drop of 20% potassium iodide solution is added which turns the solution to a cloudy brown color. It is then titrated against 0.1N Sodium thiosulfate to determine the peracetic acid concentration. The end point is the color change from brown to a clear, pale orange pink.

Peracetic Acid Test Kit

Quantity Contents 30 mL Sulfuric Acid, 1:1

15 mL Ferroin Indicator

2×30 mL Hydrogen Peroxide Titrant 30 mL Potassium Iodide 20% Solution 60 mL Peracetic Acid Titrant 1 Test Tube, 5-10-25 mL, plastic, w/cap Procedure Concentration of Hydrogen Peroxide 1. Fill test tube (0715) to 10 mL line with sample water.
2. Add 10 drops of Sulfuric Acid, 1:1 (6141WT). Swirl to mix.
3. Add 1 drop of Ferroin Indicator (6410). Swirl to mix. Solution will turn pale orange-pink if hydrogen peroxide is present.
4. While gently swirling tube, add Hydrogen Peroxide Titrant (5650LWT) one drop at a time until pale orange-pink color changes to colorless or pale yellow. Count the number of drops added. Hold bottle vertically. Count the number of drops added.
5. Discard titrated sample and rinse tube out with sample water.
6. Multiply the number of drops used in Step 4 by 50. Record as ppm Hydrogen Peroxide.

Concentration of Peracetic Acid (PAA)

1. Fill test tube (0715) to 10 mL line with sample water.
2. Add 10 drops of Sulfuric Acid, 1:1 (6141WT). Swirl to mix.
3. Add 1 drop of Ferroin Indicator (6410). Swirl to mix.
4. Add 1 drop of Potassium Iodide 20% Solution (6521). Swirl to mix. Solution will turn a cloudy brown if peracetic acid is present.
5. While gently swirling tube, add Peracetic Acid Titrant (S-6155), one drop at a time until brown color changes to a clear, pale orange-pink which persists for 20 seconds.
6. Multiply the number of drops used in Step 5 by 15. Record as ppm Peracetic Acid.

In addition, the compositions in accordance with the invention were tested against other products to illustrate the advantages of the invention. Oxyclean TM (50-70% sodium percarbonate and 30-50% sodium carbonate (soda ash)) and Jinke laundry detergent TM, a commercially available detergent typical of the industry (approximately 35-47% sodium percarbonate), were used as comparisons.

EXAMPLE 1

One Gallon Test with Intermediate Addition of Water.

| Time (hrs:min) | $H_2O_2$ (ppm) | PAA (ppm) | |
|---|---|---|---|
| | Scoop: | | |
| | Weight of Sample = 50.581 g | | |
| | Sodium percarbonate % = 73.95% | | |
| | TAED % = 14% | | |
| 0:04 | 1500 | 600 | 1 Gallon added |
| 0:50 | 2000 | 600 | ½ Gallon added |
| 1:57 | 1400 | 450 | ½ Gallon added |
| 3:02 | 1400 | 450 | ½ Gallon added |
| 5:28 | 1000 | 360 | ½ Gallon added |
| 6:50 | 1100 | 300 | ½ Gallon added |
| 8:34 | 900 | 210 | |
| | Drop-in Pak: | | |
| | Weight of sample = 62.992 g | | |
| | Sodium percarbonate % = 73.95% | | |
| | TAED % = 14% | | |
| 0:10 | 1500 | 750 | 1 Gallon added |
| 0:55 | 2300 | 750 | ½ Gallon added |
| 2:04 | 1800 | 600 | ½ Gallon added |
| 3:10 | 1500 | 480 | ½ Gallon added |
| 5:42 | 1200 | 330 | ½ Gallon added |
| 6:55 | 1100 | 270 | ½ Gallon added |
| 8:37 | 1000 | 210 | |
| | Tablet: | | |
| | Weight of sample = 40.710 g | | |
| | Sodium Percarbonate % = 70.5% | | |
| | TAED % = 12.6% | | |
| 0:14 | 600 | 120 | 1 Gallon added |
| 1:03 | 900 | 240 | ½ Gallon added |
| 2:10 | 1100 | 240 | ½ Gallon added |
| 3:20 | 900 | 150 | ½ Gallon added |
| 5:53 | 600 | 60 | ½ Gallon added |
| 6:59 | 600 | 30 | ½ Gallon added |
| 8:42 | 500 | 15 | |
| | Oxi-clean: | | |
| | Weight of sample = 53.330 g | | |
| 0:24 | 1500 | 0 | 1 Gallon added |
| 1:12 | 1900 | 0 | ½ Gallon added |
| 2:18 | 1600 | 0 | ½ Gallon added |
| 3:27 | 1300 | 0 | ½ Gallon added |
| 6:10 | 1000 | 0 | ½ Gallon added |
| 7:07 | 800 | 0 | ½ Gallon added |
| 8:49 | 600 | 0 | |
| | Jinke laundry detergent: | | |
| | Weight of sample = 28.164 g | | |
| 0:28 | 500 | 150 | 1 Gallon added |
| 1:17 | 300 | 90 | ½ Gallon added |
| 2:22 | 200 | 60 | ½ Gallon added |
| 3:30 | 200 | 60 | ½ Gallon added |
| 6:12 | 300 | 60 | ½ Gallon added |
| 7:09 | 200 | 30 | ½ Gallon added |

EXAMPLE 2

Two Gallon Test:

| Time (hrs:min) | $H_2O_2$ (ppm) | PAA (ppm) |
|---|---|---|
| Scoop: | | |
| Weight of sample = 50.581 g | | |
| Sodium percarbonate % = 73.95% | | |
| TAED % = 14% | | |
| 0:03 | 1000 | 600 |
| 1:00 | 2200 | 690 |
| 1:50 | 2300 | 720 |
| 4:23 | 2300 | 660 |
| 5:20 | 2300 | 630 |
| Drop-in Pak: | | |
| Weight of sample = 62.992 g | | |
| Sodium percarbonate % = 73.95% | | |
| TAED % = 14% | | |
| 0:19 | 2500 | 1350 |
| 1:10 | 1700 | 990 |
| 2:00 | 1400 | 900 |
| 4:45 | 2100 | 630 |
| 5:30 | 2300 | 630 |
| Tablet: | | |
| Weight of sample = 40.710 g | | |
| Sodium Percarbonate % = 70.5% | | |
| TAED % = 12.6% | | |
| 0:30 | 1000 | 300 |
| 1:20 | 1500 | 270 |
| 2:10 | 1500 | 210 |
| 4:50 | 1400 | 60 |
| 5:45 | 1300 | 120 |
| Oxi-clean: | | |
| Weight of sample = 53.330 g | | |
| 0:45 | 2000 | 0 |
| 1:35 | 1600 | 0 |
| 2:35 | 1600 | 0 |
| 5:00 | 1700 | 0 |
| 5:50 | 1800 | 0 |
| Jinke laundry detergent: | | |
| Weight of sample = 28.164 g | | |
| 0:53 | 500 | 150 |
| 1:40 | 300 | 0 |
| 2:40 | 200 | 0 |
| 5:10 | 300 | 0 |

EXAMPLE 3

5 Gallon Test:

| Time (hrs:min) | $H_2O_2$ (ppm) | PAA (ppm) |
|---|---|---|
| Scoop: | | |
| Weight of sample = 50.581 g | | |
| Sodium percarbonate % = 73.95% | | |
| TAED % = 14% | | |
| 0:15 | 1000 | 600 |
| 1:15 | 700 | 240 |
| 2:00 | 650 | 240 |
| 4:10 | 650 | 210 |
| 5:07 | 600 | 210 |
| Drop-in Pak: | | |
| Weight of sample = 62.992 g | | |
| Sodium percarbonate % = 73.95% | | |
| TAED % = 14% | | |
| 0:25 | 500 | 300 |
| 1:28 | 700 | 270 |
| 2:28 | 750 | 240 |
| 4:28 | 750 | 180 |
| 5:20 | 750 | 180 |
| Tablet: | | |
| Weight of sample = 40.710 g | | |
| Sodium Percarbonate % = 70.5% | | |
| TAED % = 12.6% | | |
| 0:20 | 500 | 300 |
| 1:21 | 600 | 30 |
| 2:10 | 500 | 15 |
| 4:20 | 450 | 15 |
| 5:16 | 450 | 15 |
| Oxi-clean: | | |
| Weight of sample = 53.330 g | | |
| 1:00 | 500 | 0 |
| 1:50 | 500 | 0 |
| 2:54 | 450 | 0 |
| 3:50 | 400 | 0 |
| 5:35 | 400 | 0 |
| Jinke laundry detergent: | | |
| Weight of sample = 28.164 g | | |
| 0:55 | 500 | 0 |
| 1:45 | 100 | 0 |
| 2:46 | 100 | 0 |
| 3:45 | 50 | 0 |
| 5:29 | 100 | 0 |

Whereas, the present invention has been described in relation to the drawings attached hereto, it should be understood that other and further modifications, apart from those shown or suggested herein, may be made within the spirit and scope of this invention.

What is claimed is:

1. A method for decontaminating wastewater in a holding tank comprising:
    adding TAED in a controlled time release manner; and
    adding a peroxygen compound in a controlled time release manner in a weight ratio of 5-15% TAED and 50-75% peroxygen resulting in constant concentration of $H_2O_2$ is maintained within the wastewater.

2. A method as set forth in claim 1 including resulting in a constant concentration of peracetic acid.

3. The method of claim 1 further comprising adjusting the pH of the wastewater such that it remains in a range of from 5 to 9.

4. The method of claim 3 wherein the adjusting the pH comprises the addition of citric acid.

5. The method of claim 1 further comprising the addition of a water softener.

6. The method of claim 1 further comprising the addition of fragrance.

7. The method of claim 1 further comprising the addition of enzymes.

8. The method of claim 1 further comprising the addition of tracer dye.

9. The method of claim 2 wherein said $H_2O_2$ and/or peracetic acid is maintained for up to fourteen days.

10. The method of claim 1 further comprising the addition of binders.

11. The method of claim 1 further comprising the addition of surfactants.

12. The method of claim 1 wherein the peroxygen compound is selected from the group consisting of sodium percarbonate, sodium perborate, perborate monohydrate and calcium peroxide.

13. The method of claim 12 wherein the peroxygen compound is sodium perborate.

* * * * *